(12) United States Patent
Avidan et al.

(10) Patent No.: US 8,363,961 B1
(45) Date of Patent: Jan. 29, 2013

(54) CLUSTERING TECHNIQUES FOR LARGE, HIGH-DIMENSIONALITY DATA SETS

(75) Inventors: Shmuel Avidan, Brookline, MA (US); Lior Shapira, Tel Aviv (IL)

(73) Assignee: Adobe Systems Incorporated, San Jose, CA (US)

(*) Notice: Subject to any disclaimer, the term of this patent is extended or adjusted under 35 U.S.C. 154(b) by 1006 days.

(21) Appl. No.: 12/395,295

(22) Filed: Feb. 27, 2009

Related U.S. Application Data

(60) Provisional application No. 61/105,276, filed on Oct. 14, 2008.

(51) Int. Cl.
*G06K 9/62* (2006.01)

(52) U.S. Cl. ......... 382/225; 382/224; 707/737; 707/747

(58) Field of Classification Search .................. None
See application file for complete search history.

(56) References Cited

U.S. PATENT DOCUMENTS 6,584,220 B2 * 6/2003 Lantrip et al. ................ 382/154

OTHER PUBLICATIONS

Slaney et al., "Locality-Sensitive Hasing for Finding Nearest Neighbors", Mar. 2008, IEEE Signal Processing Magazine, pp. 128-131.*
Ozertem et al. "Mean Shift Spectral Clustering", Sep. 25, 2007, Elsevier, The Journal of the Pattern Recognition Society, pp. 1-15.*
Indyk, "Locality-sensitive hashing using stable distributions" (with A. Andoni and M. Datar and N. Immorlica and V. Mirrokni), in Nearest Neighbor Methods in Learning and Vision: Theory and Practice (2006).
L. Zelnik-manor and P. Perona. "Self-tuning spectral clustering". In Advances in Neural Information Processing Systems 17, pp. 1601-1608. MIT Press, 2005.
Andoni, Indyk, "Near-Optimal Hashing Algorithms for Approximate Nearest Neighbor in High Dimensions," 2008.
E. K. Yaser Sheikh and T. Kanade. "Mode-seeking by medoidshifts". In ICCV'07: Proceedings of the 11th International Conference on Computer Vision, pp. 1-8, Washington, DC, USA, Oct. 2007. IEEE Computer Society.
D. Comaniciu and P. Meer. "Mean shift analysis and applications," In ICCV '99: Proceedings of the International Conference on Computer Vision-vol. 2, p. 1197, Washington, DC, USA, 1999. IEEE Computer Society.
A. Vedaldi and S. Soatto. "Quick shift and kernel methods for mode seeking". In Proceedings of the European Conference on Computer Vision (ECCV), 2008.
M. Datar, N. Immorlica, P. Indyk, and V. S. Mirrokni, "Locality-sensitive hashing scheme based on p-stable distributions," In SCG '04: Proceedings of the twentieth annual symposium on Computational geometry, pp. 253-262, New York, NY, USA, 2004. ACM.
B. Georgescu, I. Shimshoni, and P. Meer. "Mean shift based clustering in high dimensions: a texture classification example," In Computer Vision, 2003. Proceedings. Ninth IEEE International Conference on, pp. 456-463 vol. 1, 2003.
D. M. Mount and S. Arya. "Ann: A library for approximate nearest neighbor searching". 1997.

(Continued)

*Primary Examiner* — Chan S Park
*Assistant Examiner* — David Perlman

(57) ABSTRACT

A clustering method for high-dimensionality data includes identifying a set of nearest neighbors of a point in a multidimensional space and determining the centroid of the set of nearest neighbors, where the centroid is a member of the set of nearest neighbors. The method is then repeated using the neighbors identified around the computed centroid. In one embodiment, the method may terminate when the computed centroid becomes stationary over successive iterations. The resulting centroid may be returned as a mode of the data set. Points of the data set having common modes may be assigned to the same cluster.

34 Claims, 4 Drawing Sheets

OTHER PUBLICATIONS

S. Paris and F. Durand. "A topological approach to hierarchical segmentation using mean shift". Computer Vision and Pattern Recognition, 2007. CVPR '07. IEEE Conference on, pp. 1-8, Jun. 2007.

R. Subbarao and P. Meer. "Nonlinear mean shift for clustering over analytic manifolds". In CVPR '06: Proceedings of the 2006 IEEE Computer Society Conference on Computer Vision and Pattern Recognition, pp. 1168-1175, Washington, DC, USA, 2006. IEEE Computer Society.

Shakhnarovich, Indyk, "Introduction," in Nearest Neighbor Methods in Learning and Vision: Theory and Practice (2006).

Indyk,"Near-Optimal Hashing Algorithms for Approximate Near(est) Neighbor Problem," 2006.

J. A. Cuesta-Albertos and A. Nieto-Reyes. The random tukey depth. Comput. Stat. Data Anal., 52(11):4979-4988, 2008.

* cited by examiner

CLUSTERING TECHNIQUES FOR LARGE, HIGH-DIMENSIONALITY DATA SETS

PRIORITY CLAIM

This application claims the benefit of priority of U.S. Provisional Patent Application No. 61/105,276, filed Oct. 14, 2008, which is hereby incorporated by reference in its entirety.

BACKGROUND

1. Field of the Invention

The present invention is directed generally to digital data processing, and more particularly to analysis of high-dimensionality data.

2. Description of the Related Art

Machine-based classification and identification of images based on digital image data is a complex problem. Compared to other types of digitized data, image data for any but the simplest images tends to be high in bandwidth and complexity. Techniques to identify features in images, such as the objects or surfaces represented in an image, often rely on algorithms that attempt to identify points in an image that bear some relationship to one another and to segregate these identified points from other sets of points. Such algorithms may be referred to as clustering algorithms.

In order to robustly represent the rich variety of features that may be present in image data, representations of image data may be highly dimensional. For example, image data may reflect numerous image properties beyond merely geometric location within a Cartesian coordinate space. Depending on the approach used, individual image data points may have dozens or hundreds of dimensions.

To be effective in the context of imaging, clustering algorithms thus need to readily extend to highly dimensional data. However, many existing clustering techniques are not robust, in that they are sensitive to noise in the image data and/or small variations in the parameters that govern the algorithm's performance. Moreover, complex images may include vast numbers of data points of high dimensionality, and many existing clustering techniques fail to scale well as the data set size increases.

SUMMARY

Various embodiments of systems, methods, and computer-readable storage media for clustering highly-dimensional data are presented. In one embodiment, a computer-implemented method includes generating a mode m of a set P including a plurality of data points defined within a multidimensional space. Generating the mode may include (a) for a point p selected from within set P, identifying a set S including a plurality of points within set P that neighbor point p according to a distance metric defined on the multidimensional space; (b) generating a centroid point c of set S, wherein centroid point c is a member of set S; (c) determining whether a distance between the centroid point c and the point p satisfies a threshold value; (d) in response to determining that the distance between the centroid point c and the point p does satisfy the threshold value, returning centroid point c as a mode m of set P and terminating, and in response to determining that the distance between the centroid point c and the point p does not satisfy a threshold value, assigning centroid point c to point p and repeating (a) through (d). Each of (a) through (d) may be implemented by one or more computer systems.

Figure 1:
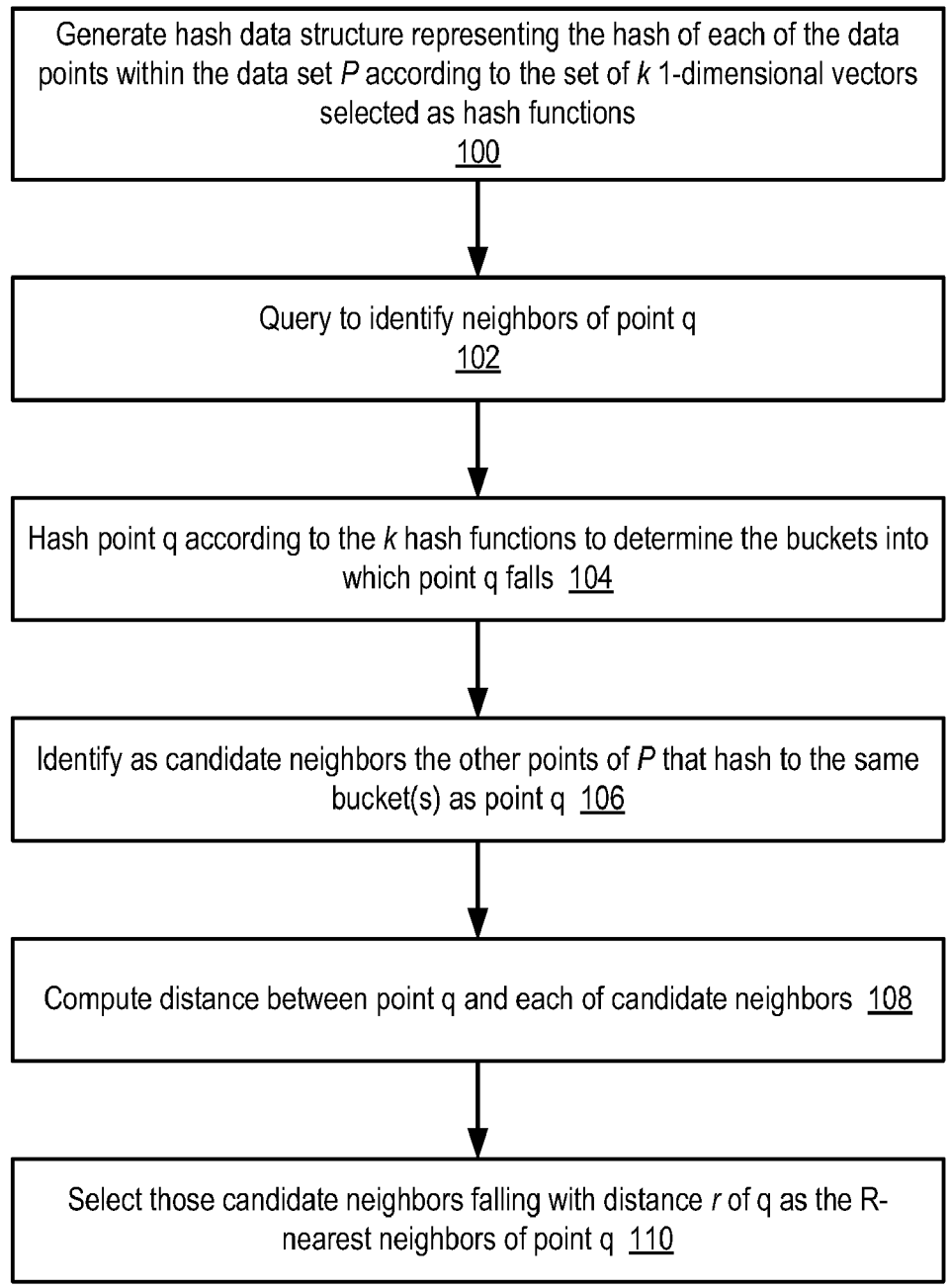
FIG. 1 is a flow diagram illustrating one embodiment of a method of determining nearest neighbors in a multidimensional space.

While the disclosure is susceptible to various modifications and alternative forms, specific embodiments are shown by way of example in the drawings and are herein described in detail. It should be understood, however, that drawings and detailed description thereto are not intended to limit the disclosure to the particular form disclosed, but on the contrary, the disclosure is to cover all modifications, equivalents and alternatives falling within the spirit and scope of the present invention as defined by the appended claims.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the following detailed description are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

INTRODUCTION

Many types of computational problems involve the processing of sets of data points that are defined within a high-dimensional space. For example, in the context of image processing, a polygonal surface of an imaged 3-dimensional object may be characterized by a set of coordinates defining the location of the surface's vertices within a 3-dimensional coordinate space. Additionally, the surface may have properties such as color, transparency, reflectivity, or other image properties defined according to the image model being employed. For a particular surface, each of these various properties may be discretely characterized by parameters within a corresponding feature space. Thus, a full description of the properties of a particular image surface may involve dozens or hundreds of independently-defined data points, each falling along an axis within a high-dimensional feature space. It is noted that, for purposes of explanation, image processing is used frequently herein as an example application. However, the techniques described herein are in no way limited to image processing, and may be used in any suitable application context on any suitable type of data set (e.g., audio data, video data, seismic data, statistical data, etc.).

Similarly, other systems of feature representation may involve feature spaces of high dimensionality. For example, the scale invariant feature transform (SIFT) algorithm may be applied to an image to generate image keypoints and associated descriptors. In one implementation, SIFT descriptors may be defined within a 128-dimensional feature space.

Given a set of data points defined within a high-dimensional feature space, one common data processing problem is the task of clustering the data points into various groups. Clustering problems may arise, for example, in the context of attempting to identify particular features or regions within an image, or attempting to classify an unknown image with respect to a dictionary or database of images. For instance, an image may depict a number of different objects that are distinct and readily identifiable by the human eye. In order to automate the recognition of depicted objects by a computer, a clustering approach may be applied to a set of data points that is representative of the entire image, with the goal of segregating the data points into individual groups. If the clustering is successful, data points within the resultant groups should bear more feature similarities with each other than with data points in other groups. Thus, the resultant groups may correspond to particular regions or objects within the original image, which may facilitate the subsequent recognition or classification of the image.

One particular class of clustering algorithm may be referred to as mode-seeking algorithms. Generally speaking, mode-seeking algorithms attempt to differentiate regions of the feature space having a comparatively high density of data points from regions of the feature space that are comparatively sparsely populated with data points. High-density regions of the feature space may also be referred to as modes. In some embodiments, mode-seeking algorithms may identify denser regions by locating maxima in the probability density field corresponding to the data points.

The mean-shift algorithm is one type of mode-seeking algorithm that may be employed in a clustering analysis. The general operation of the mean-shift algorithm on a data set is as follows: for each given point in the data set, compute the mean (i.e., the mathematical average) of all of the data points in the given point's nearest neighborhood. Then, iteratively compute the mean of all of the data points in the nearest neighborhood of the previously computed mean, such that each computed mean becomes the basis for determining the nearest neighbors used to compute the successive mean. (In other words, at each iteration, the location in the feature space around which the nearest neighbors are determined is "shifted" to the previously computed mean.) Iteration terminates when the difference in successively computed means falls below some threshold convergence value. For example, in the case of perfect convergence after a sufficient number of iterations, the location of the mean may become stationary within the feature space, such that the difference between successively computed means is zero. After the mean-shift algorithm terminates, the final location of each computed mean may correspond to a mode of the data set. Those points that converge to the same mode may be identified as belonging to the same cluster of points.

In various embodiments, the neighborhood of the given point may be defined as a region that contains a specific number of data points k that are closest to the given point (also referred to as a k-nearest neighbor problem) or a region that is defined in terms of a radius R in the feature space around the given point (also referred to as an R-nearest neighbor problem). It is noted that in the k-nearest neighbor problem, the number of nearest neighbor points is fixed at k, while the size of the region containing the nearest neighbors may vary depending on point density in the region of the given point. By contrast, in the R-nearest neighbor problem, the size of the nearest-neighbor region is fixed at R, while the number of points contained in the region may vary depending on point density in the region of the given point.

In general, the mean-shift algorithm is parameterized only in terms of the neighborhood size (e.g., k or R) and does not require prior knowledge of the number of clusters in a data set or their shape or composition. However, using the mean function as the basis for computing each iteration of the algorithm may lack robustness, in that the presence of noise (e.g., outlying points) in the data set may significantly perturb the results. As a simplistic example, consider the set of scalar data points $\{2, 3, 5, 5, 6, 7, 7, 7, 9\}$. The mean of these nine points is 5.67. If the set of data points contains a tenth outlier point having a value of 20 (e.g., as the result of sampling noise, measurement error, or another anomaly), the mean of the set shifts to 7.1—a shift of over 25% relative to the mean computed without the outlier.

Tukey Median and Locality Sensitive Hashing

With respect to scalar (i.e., 1-dimensional) data, the median is typically more robust with respect to outliers than is the mean. For example, the median of the nine-point data set in the above example is 6, whereas the median of the ten-point data set including the outlier value of 20 is 6.5 (i.e., the mean of the middle two data points in the ordered set). Thus, inclusion of the outlier value perturbs the median by less than 10%, in contrast to the 25% perturbation to the mean.

Strictly speaking, a median value is meaningful only with respect to 1-dimensional data. However, the concept of a median can be generalized to multidimensional data. Broadly speaking, a centerpoint of a multidimensional data set may be defined as a point in the multidimensional space for which any hyperplane passing through the centerpoint divides the data set into two roughly equal parts. The halfspace depth of any point in a multidimensional space refers to the minimum number of data points that lie on one side of a hyperplane through that point. The Tukey median is a centerpoint of a multidimensional data set that maximizes the halfspace depth.

Generally, the Tukey median of a set of multidimensional data points may exhibit similar robustness to the effects of outlier data, relative to the mean, as the median of a 1-dimensional data set. Thus, in some embodiments, the Tukey median of a defined neighborhood of data points may be substituted for the mean of the neighborhood of data points in the mean-shift algorithm described above. This substitution may improve the robustness of the mode-seeking algorithm with respect to anomalous data, relative to the mean-shift algorithm. Analytically determining the Tukey median of a set of data points may be computationally difficult. However, an approximation technique that is useful for identifying the nearest neighbors of a point in a multidimensional space— known as Locality Sensitive Hashing (LSH)—may be extended to generate an accurate approximation of the Tukey median of those neighboring points. Before considering the application of LSH techniques to determine the Tukey median, it is useful to consider the general features of the LSH algorithm.

At an intuitive level, the LSH algorithm operates under the premise that in general, if data points are close together within a multidimensional space, the projections of those data points onto a set of randomly selected 1-dimensional lines should also be close together. Thus, to identify the nearest neighbors of a given point in the multidimensional space, the neighbors of the given point as projected onto the 1-dimensional lines may be employed. Since identifying the projections of points onto a fixed set of lines is less computationally expensive than the brute-force technique of determining the distance from a given point to all other points within the multidimensional space, the LSH algorithm may improve the performance of locating nearest neighbors.

More formally, in one embodiment, the location of nearest neighbors using the LSH algorithm proceeds by first hashing all of the data points p in the multidimensional data set P using a set of k hash functions $h_i(x)$ (where i varies from 1 to k), each of which is divided into L bins or buckets. The choice of k and L may influence the accuracy and computational performance of the algorithm, and may be tuned for different implementations of the algorithm.

Each of the hash functions $h_i(x)$ may have the general property that if two points p and q in the multidimensional are closer together than some distance r, the probability that $h_i(x)$ will hash p and q into the same hash bucket is high. Conversely, if points p and q are separated by at least distance r, the probability that $h_i(x)$ will hash p and q into the same hash bucket is lower. More formally, $$d(p,q) < r : Pr(h_i(p) = h_i(q)) \geq c_1$$

$$d(p,q) \geq r : Pr(h_i(p) = h_i(q)) \geq c_2$$

where d(p, q) expresses the distance between points p and q. Under these conditions, the probability that p and q will hash to the same bucket if the distance metric is satisfied is at least $c_1$, while the probability that these two points will hash to the same bucket if the distance metric is not satisfied is at most $c_2$, where $c_1 > c_2$.

In one embodiment, hash functions $h_i(x)$ may correspond to a set of k randomly-selected vectors or lines within the multidimensional data space, each of which is divided into L equal segments. The hash of any given point q in the data space may then be given as the dot product of q with each of the vectors corresponding to $h_i(x)$ That is, the hash of point q involves projecting point q onto each of the k vectors and determining, for each of the k vectors, which one of the L buckets of that vector the projection of q falls into.

FIG. 1 illustrates one embodiment of a method of operation of the LSH algorithm to answer the R-nearest neighbor query: for a given point q within a data set P of points in a multidimensional data space, what are the points of P that are within distance r from point q? In block 100, operation begins with the generation of a hash data structure that represents the hash of each of the points in the data set P according to the selected hash functions. That is, generation of the hash data structure assigns each of the points in data set P to one of the L buckets of each of the k hash functions $h_i(x)$, according to the projections of the points onto the hash functions. It is noted that the hash data structure may be generated at any time prior to a nearest neighbor query on data set P.

A query to identify the nearest neighbors of point q may then occur (block 102). In response to the query, point q is hashed according to the k hash functions $h_i(x)$ to identify the buckets into which point q falls (block 104). For example, the dot product of point q with each of $h_i(x)$ may be determined, which may identify a point of projection of q along the line described by each of $h_i(x)$. For each line, this resultant point falls into segment b, a particular one of the L segments of that line. Point q may then be said to fall within bucket b of that line.

Once the buckets b of hash functions $h_i(x)$ to which point q hashes have been determined, the other points in data set P that hash to the same bucket(s) as point q may be identified as candidate neighbors (block 106). For example, the previously-generated hash data structure indicates which points of P fall within which buckets. Therefore, this data structure may be used to determine the other points of P that are members of the same bucket as q. In some embodiments, any point of P that hashes to the same bucket as q for any one of hash functions $h_i(x)$ may be considered a candidate neighbor of q. In other embodiments, to qualify as a candidate neighbor, a point of P must hash to the same bucket as q with respect to at least some number n of the hash functions $h_i(x)$, where n>1.

Once the candidate neighbors have been identified, the distance between each of the candidate neighbors and point q may be determined (block 108). Those candidate neighbors that fall within distance r of point q may be identified as the R-nearest neighbors of q (block 110).

It is noted that while computing the distance between two points in a multidimensional space may be computationally expensive, the hashing process may reduce the number of candidate neighbors for which the distance must be computed.

That is, in the brute-force approach, every point in P is a candidate neighbor of q for which a distance must be determined. By contrast, in the LSH approach, the number of candidate neighbors may be less than all points in P—in some cases, substantially less, depending on how the points are distributed within the multidimensional space and the behavior of the hash functions used. Thus, use of the LSH algorithm may scale to accommodate much larger data sets than other algorithms.

In the foregoing discussion of the LSH algorithm, it was seen that by projecting points in a multidimensional space onto a set of vectors defined within a simpler, 1-dimensional space, the problem of determining nearest neighbors may be simplified. It has been shown that the Tukey median of a set of points in a multidimensional space may also be approximated by projecting the points onto a random set of independent 1-dimensional vectors and analyzing the projections to identify the Tukey median. Thus, the problems of generating nearest neighbors and of identifying the Tukey median of a set of points overlap to the extent that 1-dimensional projective techniques may be used to address both problems.

Figure 2:
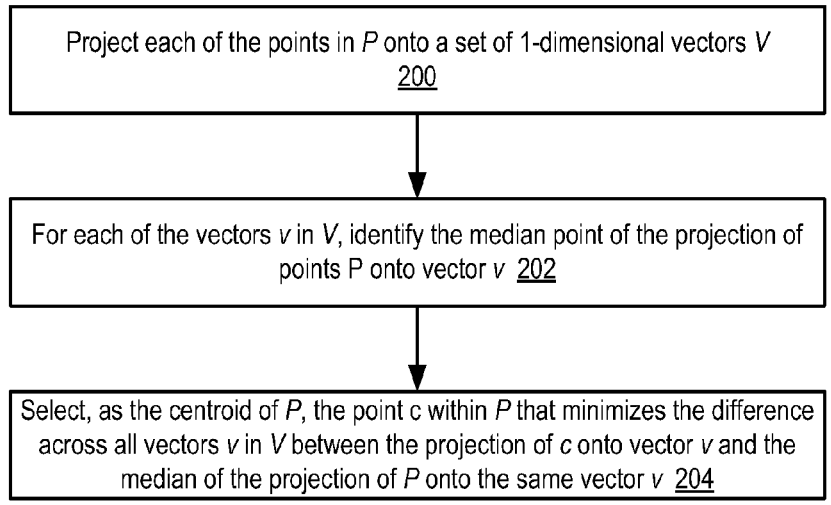
FIG. 2 is a flow diagram illustrating one embodiment of a method of determining a centroid of a set of points in a multidimensional space.

The Tukey median of a set of points P in a multidimensional space may also be referred to as the centroid of P. In one embodiment, shown in FIG. 2, determining the centroid of P using 1-dimensional projections may be qualitatively understood as follows: first, project each of the points in P onto a set of 1-dimensional vectors V (block 200). For each of the 1-dimensional vectors v in the set V, identify the median point of the projections of P onto vector v (block 202). The member of P that is identified as closest to the median of all the projections is then selected as the centroid of P (block 204). That is, the centroid point c corresponds to the point in P that minimizes the total difference, across all of the vectors v in V, between the projection of c onto each vector v and the median of the projection of P onto the same vector v. Mathematically, the centroid may be defined with respect to P as:

$$\text{Centroid}(P) = \min_{\exists c \in P} \{\text{sum}_{\forall v \in V}((c \circ v) - \text{median}(P \circ v))\}$$

where ∘ denotes a suitable operator for projection of a point or a set of points onto a vector, such as the dot product operator.

It is noted that in this embodiment, the centroid of P is defined as a member of the set of points P. That is, the centroid of a data set has the property that it is one of the points that actually exists within the data set. By contrast, other metrics—such as the mean of a data set—may produce a point within the multidimensional space that does not correspond to any point within the data set. Defining the centroid to be a member of the data set may decrease the computational complexity and noise susceptibility of mode-seeking algorithms, relative to metrics such as the mean.

In some embodiments, the set of randomly selected 1-dimensional vectors that is used to determine the centroid may be identical to the set of hash function vectors $h_i(x)$ vectors employed by the LSH algorithm to determine nearest neighbors. In such an embodiment, the hash data structure used to store the projective hash may also be employed to retrieve the projection data, discussed above, that is used to determine the centroid. In some embodiments, the hash data structure may be augmented to represent projection data for each of vectors $h_i(x)$ with a greater precision than provided by the L hash buckets discussed above. For example, for each vector, the hash data structure may indicate data point membership in each of L hash buckets for the purpose of nearest-neighbor identification, but may also indicate data point membership in each of M buckets (M>L) for the purpose of centroid identification.

It is contemplated that in other embodiments, the sets of vectors and data structures used to determine and store centroid information may be entirely distinct from those vectors and data structures used to identify nearest neighbors.

Centroid-Shift Clustering

The concepts of using LSH-based nearest neighbor techniques and of the projection-approximated Tukey-median-based centroid discussed above may be combined and extended to yield a new mode-seeking clustering algorithm, referred to herein as centroid-shift clustering. Generally speaking, centroid-shift clustering proceeds in an iterative manner similar to the mean-shift algorithm. However, instead of determining the mean of a set of nearest neighbor points at each iteration, the centroid-shift algorithm determines the centroid. As noted above, using the centroid may yield an algorithm that is more robust to anomalous data than the mean-shift algorithm. Also, the use of hash-based nearest neighbor location algorithms such as LSH as part of the centroid-shift algorithm may enable the algorithm to accommodate larger data sets with better computational performance than other algorithms.

Figure 3:
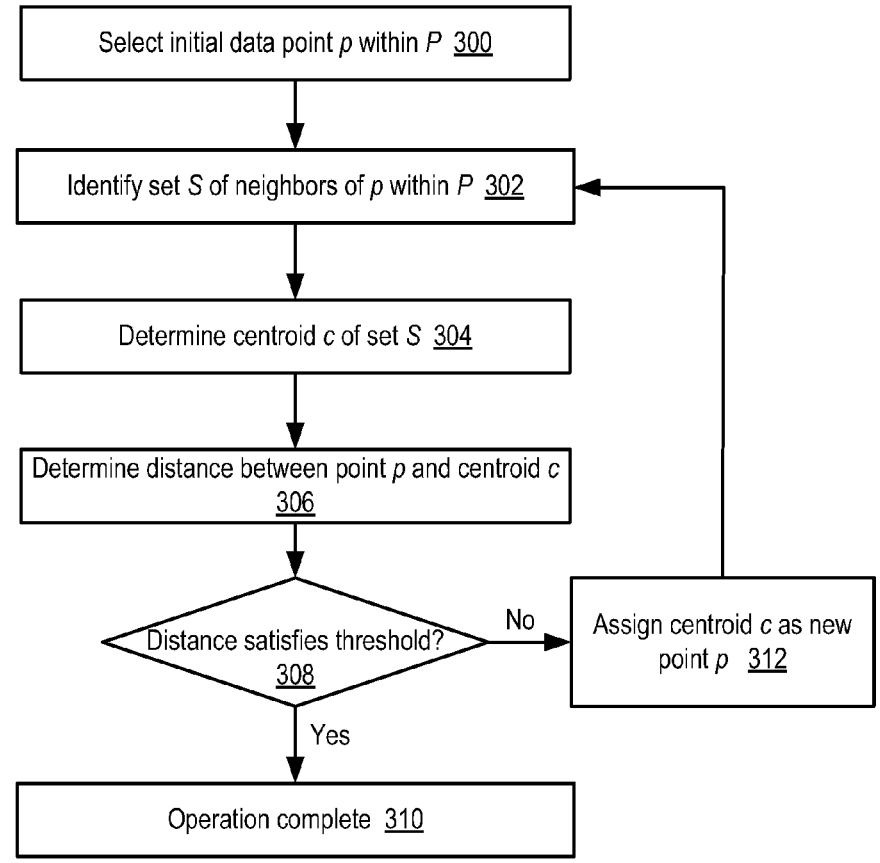
FIG. 3 is a flow diagram illustrating one embodiment of a centroid-shift mode-seeking algorithm that may be employed to perform clustering of data of high dimensionality.

One embodiment of a method of centroid-shift clustering is illustrated in FIG. 3. In the illustrated embodiment, operation begins in block 300 where an initial data point p within a multidimensional data set P is selected (e.g., at random or using a heuristic). It is noted that multiple applications of the algorithm starting from a number of different initial points p may be executed sequentially or concurrently. The neighbors of point p within the multidimensional space are then identified (block 302).

In one embodiment, the general approach of the LSH algorithm discussed above with respect to FIG. 1 may be employed to determine these neighboring points. For example, a hash data structure that hashes all the points in P to a set of randomly selected 1-dimensional vectors may be generated. (As noted previously, this data set may be generated prior to an initial nearest neighbor query, and by extension, prior to an application of the centroid-shift clustering algorithm.) Then, point p may be hashed, and candidate neighbors from P that hash to the same bucket as p may be identified.

It is noted that in one embodiment of the centroid-shift algorithm, it may be unnecessary to compute the distance from p to each candidate neighbor and then eliminate those candidates that do not satisfy the distance parameter r. As noted above, the hash functions $h_i(x)$ employed in the LSH algorithm are characterized in terms of the probability that they will hash points that are within distance r from each other into the same buckets. Hash functions $h_i(x)$ may be selected such that on average, a significant majority (e.g., 80-90% in some embodiments) of the points returned by the LSH algorithm as candidate neighbors of a point q do in fact fall within distance r from q. It is true that the set of candidate neighbors may include outliers that fail to fall within distance r from q. However, as noted above, the centroid algorithm may be robust with respect to outliers, such that their inclusion in a data set may only minimally affect the resultant centroid, and the benefit of removing the outliers is outweighed by the cost of doing so. Therefore, in some embodiments, the pruning of candidate neighbors according to distance r, as shown in blocks 108-110 of FIG. 1, may be eliminated from the LSH algorithm as employed in the centroid-shift algorithm. Eliminating this pruning may save considerable computational resources and may substantially improve the performance of the centroid-shift algorithm.

Given the set S of p and its neighbors, the centroid c of set S is determined (block 304). For example, the method of FIG. 2 discussed above may be employed to determine the projections of S onto a set of randomly selected independent vectors. In some embodiments, the vectors used to determine the centroid may be the same as the vectors used by the LSH algorithm to determine candidate neighbors. In such embodiments, projecting set S onto the vector set may involve simply querying the hash data structure with respect to each of the points in S. Then, as discussed above, the point c within S that minimizes the total difference, across the set of vectors, between the projection of c onto each vector and the median of the projection of S onto the same vector is selected as the centroid.

The distance between point p and centroid c is then determined (block 306). If this distance satisfies a threshold value, then operation of the centroid-shift algorithm may be complete and point p may correspond to a mode of data set P (blocks 308-310). In one embodiment, the threshold value may be a numerical value such as zero or a nonzero value, and determining whether the distance satisfies the threshold value may include determining whether the distance is less than (or less than or equal to) the threshold value. For example, upon convergence, the centroid may become stationary, such that successively computed centroids are identical to or within a threshold value of previously computed centroids. If the distance between point p and centroid c is greater than the threshold value, then centroid c is assigned to point p (block 312) and iteration may proceed from block 302.

In one embodiment, the centroid-shift mode-seeking algorithm may be repeatedly applied using each point p within data set P (or, in some cases, a subset of P such as a random sampling) as the initial point. Once the mode has been identified for each of multiple points p, those points that converge to a common mode (either exactly, or in some cases within a threshold of error) may be identified as members of the same cluster of points. That is, the mode returned by the centroid-shift algorithm may be used as a criterion for cluster membership.

The centroid-shift algorithm has been described above in the context of points and sets of points. That is, the algorithm may determine a particular point c to be the centroid of a set of points that neighbor point p, and may iterate on the basis of shifting point p to the previously computed centroid point c. However, the centroid-shift algorithm may also be generalized to operate on clusters of points and sets of such clusters. That is, the algorithm may first identify a cluster of points P within a set of clusters S, and may then identify the set of neighboring clusters N that satisfy a distance metric r with respect to cluster P. Then, the centroid cluster C of N may generated by identifying the cluster that minimizes the error in the projective median of all clusters in N onto a set of vectors V, in a manner analogous to the technique described above with respect to locating the centroid point c of a set of points P. Iteration may then continue using the newly determined centroid cluster C.

Exemplary Computer System Embodiment

Embodiments of the systems and methods described herein may be used to analyze, characterize, and represent, digital images, e.g., digital photographs, digital art, scans of artwork, etc., and the representations of the images may be useful in image search applications.

Figure 4:
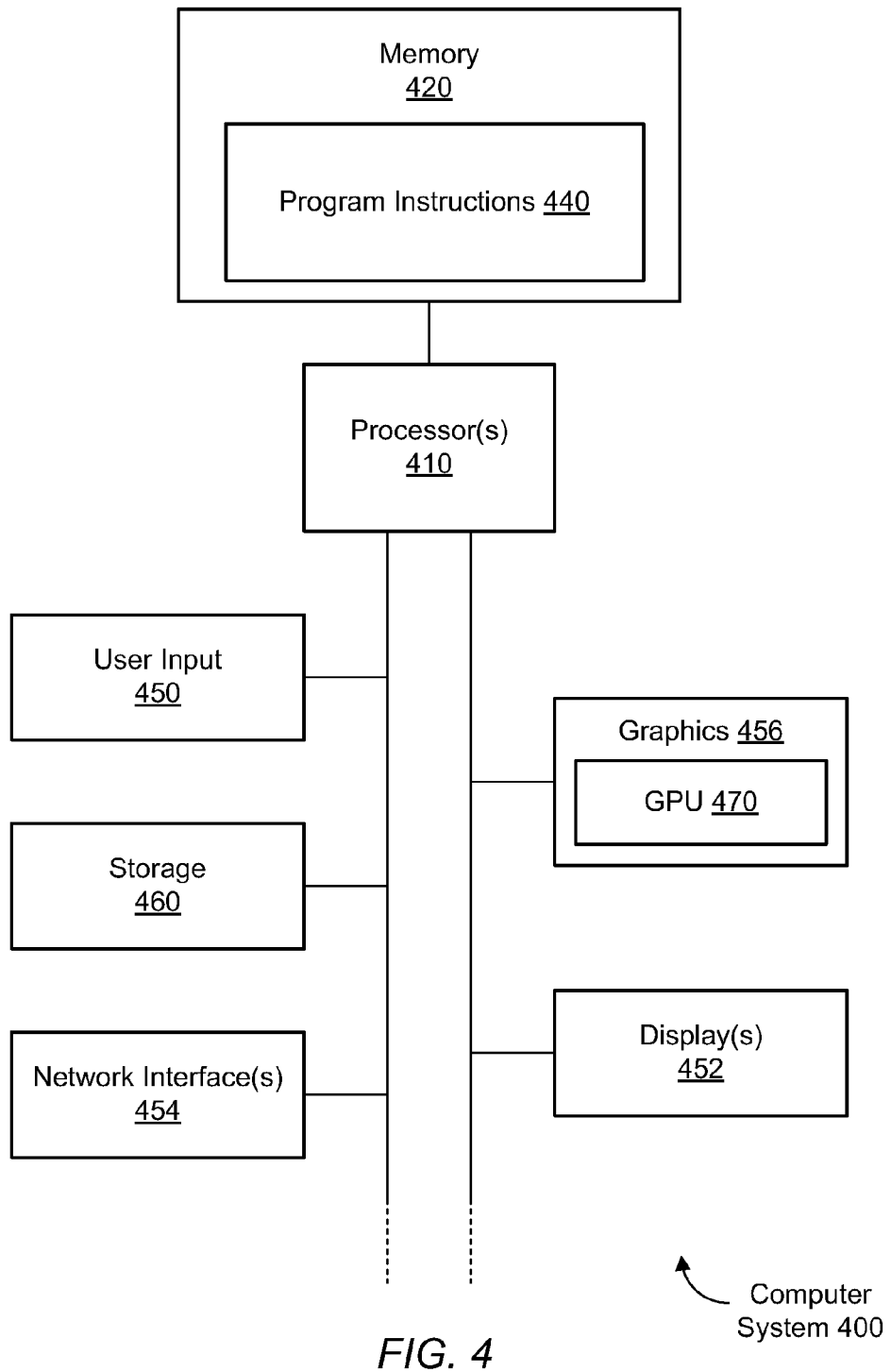
FIG. 4 is a block diagram of an exemplary computer system configured to implement embodiments of the techniques disclosed.

FIG. 4 is a block diagram illustrating constituent elements of a computer system 100 that may be configured to implement embodiments of the systems and methods described herein. The computer system 400 may include one or more processors 410 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 400, such as various versions of Unix, Linux, Windows® from Microsoft Corporation, MacOS® from Apple Inc., or any other operating system that enables the operation of software on a hardware platform. The processor(s) 410 may be coupled to one or more of the other illustrated components, such as a memory 420, by at least one communications bus.

In one embodiment, a specialized graphics card or other graphics component 456 may be coupled to the processor(s) 410. The graphics component 456 may include a graphics processing unit (GPU) 170, which in some embodiments may be used to perform at least a portion of the techniques described above. Additionally, the computer system 400 may include one or more imaging devices 452. The one or more imaging devices 452 may include various types of raster-based imaging devices such as monitors and printers. In one embodiment, one or more display devices 452 may be coupled to the graphics component 456 for display of data provided by the graphics component 456.

In one embodiment, program instructions 440 that may be executable by the processor(s) 410 to implement aspects of the techniques described herein (including any aspect of the techniques illustrated in FIGS. 1-3, or suitable variants thereof) may be partly or fully resident within the memory 420 at the computer system 400 at any point in time. For example, these program instructions 440 may be executable to implement all or any part of the LSH nearest-neighbor algorithm, including the functionality to populate and manage the hash data structure described above. Program instructions 440 may also be executable to implement all or any part of the algorithms for determining the centroid of a set of points and for performing the centroid-shift mode-seeking algorithm described above. Additionally, program instructions 440 may be executable to perform any other suitable functions, such as operating system or application functionality.

The memory 420 may be implemented using any appropriate medium such as any of various types of ROM or RAM (e.g., DRAM, SDRAM, RDRAM, SRAM, etc.), or combinations thereof. The program instructions may also be stored on a storage device 460 accessible from the processor(s) 410. Any of a variety of storage devices 460 may be used to store the program instructions 440 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 460 may be coupled to the processor(s) 410 through one or more storage or I/O interfaces. In some embodiments, the program instructions 440 may be provided to the computer system 400 via any suitable computer-readable storage medium including the memory 420 and storage devices 460 described above.

The computer system 400 may also include one or more additional I/O interfaces, such as interfaces for one or more user input devices 450. In addition, the computer system 400 may include one or more network interfaces 454 providing access to a network. It should be noted that one or more components of the computer system 400 may be located remotely and accessed via the network. The program instructions may be implemented in various embodiments using any desired programming language, scripting language, or combination of programming languages and/or scripting languages, e.g., C, C++, C#, Java™, Perl, etc. The computer system 400 may also include numerous elements not shown in FIG. 4, as illustrated by the ellipsis.

Figure 5:
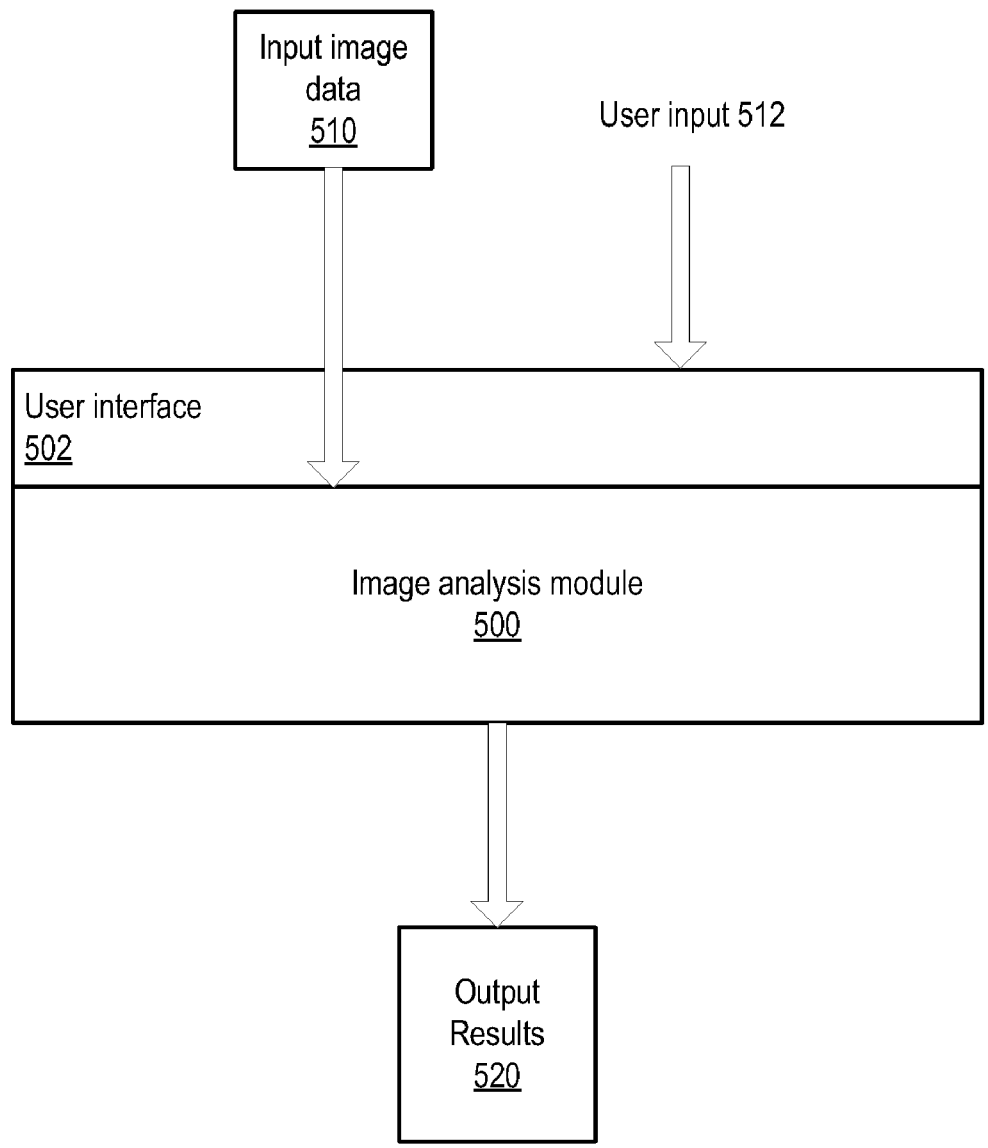
FIG. 5 illustrates an exemplary image analysis module that may be configured to implement embodiments of the techniques disclosed.

FIG. 5 illustrates an exemplary image analysis module that may implement embodiments of methods disclosed herein, as described above with reference to FIGS. 1-3. In one embodiment, module 500 may provide a user interface 502 that includes one or more user interface elements via which a user may initiate, interact with, direct, and/or control the method performed by module 500. Module 500 may be operable to obtain digital image data for a digital image 510, receive user input 512 regarding the image data, analyze the image data and/or the input, and output analysis results for the image data 520. For example, module 500 may implement any or all of the techniques described above with respect to FIGS. 1-3. In one embodiment, the module may include or have access to additional information, e.g., a collection of representative images, feature descriptors, a visual alphabet, etc.

Image analysis module 500 may be implemented as or in a stand-alone application or as a module of or plug-in for an image processing application. Examples of types of applications in which embodiments of module 500 may be implemented may include, but are not limited to, image (including video) analysis, characterization, search, processing, and/or presentation applications, as well as applications in security or defense, educational, scientific, medical, publishing, digital photography, digital films, games, animation, marketing, and/or other applications in which digital image analysis, characterization, representation, or presentation may be performed. Specific examples of applications in which embodiments may be implemented include, but are not limited to, Adobe® Photoshop® and Adobe® Illustrator®. Module 500 may also be used to display, manipulate, modify, classify, and/or store images, for example to a memory medium such as a storage device or storage medium.

To facilitate presentation, many of the examples provided have been discussed in the context of image processing. However, it is noted that the clustering techniques described herein need not be limited to image processing applications. Rather, it is contemplated that these clustering techniques may be applied to any type of multidimensional data, regardless of what underlying phenomena the data represents. For example and without limitation, these clustering techniques may be employed with respect to audio data, electromagnetic field data, statistical data, or any other type of multidimensional data.

It is noted that the data set on which the above-described clustering techniques may be employed may be representative of a physical object or a physical phenomenon. The data set may be generated in any fashion suitable to the type of data, such as digitization of sensor data where the sensor is configured to detect visible or near-visible portions of the electromagnetic spectrum (e.g., visible light), invisible portions of the electromagnetic spectrum (e.g., radio frequencies), acoustic energy, temperature, motion, or any other physical input or combination of inputs. The data set may pass through other types of analysis and/or transformation prior to and/or subsequent to performance of clustering.

It is noted that the order in which the various operations detailed above have been described and illustrated has been chosen only to facilitate exposition. Additionally, the use of distinguishing reference numerals and reference characters such as (a), (b), (c), (d), etc., is intended only to facilitate the description of the items denoted with such reference numerals or reference characters, and does not dictate or imply any necessary ordering of the items so denoted. In various embodiments, the operations described herein may be performed in any suitable order, including orderings that differ from those described above. For example, where multiple instances of a method are to be performed on multiple different data points, the various operations that result may be serialized, parallelized, or interleaved in any suitable fashion. Further, it is contemplated that in some embodiments, various ones of the operations described above may be omitted or combined with other operations, or other additional operations may be performed.

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
   generating a mode m of a set P including a plurality of data points defined within a multidimensional space, wherein generating said mode comprises:
   (a) for a point p selected from within set P, identifying a set S including a plurality of points within set P that neighbor point p according to a distance metric defined on the multidimensional space;
   (b) generating a centroid point c of set S, wherein centroid point c is a member of set S, and wherein generating the centroid point c of set S comprises:
      projecting each point in set S onto each of a plurality of vectors v within a set V; and
      selecting as centroid point c the point in S that minimizes a total difference, across all of the vectors v in V, between the projection of c onto each given vector v and the median of the projection of S onto the same given vector v;
   (c) determining whether a distance between the centroid point c and the point p satisfies a threshold value;
   (d) in response to determining that the distance between the centroid point c and the point p does satisfy the threshold value, returning centroid point c as a mode m of set P and terminating, or in response to determining that the distance between the centroid point c and the point p does not satisfy a threshold value, assigning centroid point c to point p and repeating (a) through (d);
   wherein each of (a) through (d) is implemented by one or more processors.

2. The computer-implemented method as recited in claim 1, wherein identifying the set S of points within P that neighbor the selected point p comprises identifying as members of set S one or more points within set P that, when the points in set P are hashed according to a set of hash functions, occupy one or more hash buckets in common with hashed point p.

3. The computer-implemented method as recited in claim 2, wherein identifying points in set P that occupy one or more hash buckets in common with hashed point p comprises querying a hash data structure, wherein said hash data structure comprises records indicative of results of hashing each of the points in set P according to the set of hash functions.

4. The computer-implemented method as recited in claim 2, wherein the set of hash functions comprises the set V, wherein each of the vectors v is a 1-dimensional vector, wherein the members of set V are randomly selected from the multidimensional space.

5. The computer-implemented method as recited in claim 4, wherein hashing a given point q within set P according to the set of hash functions comprises projecting point q onto each of the vectors v within set V.

6. The computer-implemented method as recited in claim 5, wherein projecting point q onto a given one of vectors v within set V comprises determining a dot product between point q and given vector v.

7. The computer-implemented method as recited in claim 5, wherein projecting point q onto a given one of vectors v comprises retrieving a previously-determined value from said hash data structure, wherein the previously-determined value is indicative of a projection of point q onto the given vector v.

8. The computer-implemented method as recited in claim 1, wherein the members of set P correspond to image data that is representative of an image, wherein the image is capable of being displayed to a user.

9. The computer-implemented method as recited in claim 1, further comprising:
- generating a plurality of modes of set P, wherein generating each given one of said plurality of modes comprises initializing a selected point q to a respective member of a set of points Q, wherein the modes correspond respectively to the members of set Q, wherein set Q is a subset of set P, and wherein generating each given mode respectively comprises:
  - (e) for point q within Q, identifying a set T including a plurality of points within Q that neighbor point q according to the distance metric defined on the multidimensional space;
  - (f) generating a centroid point d of set T, wherein centroid point d is a member of set T;
  - (g) determining whether a distance between the centroid point d and the point q satisfies a threshold value; and
  - (h) in response to determining that the distance between the centroid point d and the point q does satisfy the threshold value, returning centroid point d as the given mode of Q and terminating as to the given mode, or in response to determining that the distance between the centroid point d and the point q does not satisfy a threshold value, assigning centroid point d to point q and repeating (e) through (h);
- wherein each of (e) through (h) is implemented by one or more processors.

10. The computer-implemented method as recited in claim 9, further comprising:
- (i) determining whether two or more members of set P have a common mode; and
- (j) in response to determining that said two or more members of set P have a common mode, assigning said two or more members of set P to a same cluster of points;
- wherein each of (i) and (j) is implemented by one or more processors.

11. The computer-implemented method as recited in claim 10, wherein determining whether said two or more members of set P have a common mode comprises determining whether respective modes of said two or more members of set P differ by less than a threshold value.

12. A non-transitory computer-readable storage medium that stores instructions, wherein the instructions are executable one or more processors to:
- generate a mode m of a set P including a plurality of data points defined within a multidimensional space, wherein to generate said mode, the instructions are further executable by the one or more processors to:
  - (a) for a point p selected from within set P, identify a set S including a plurality of points within set P that neighbor point p according to a distance metric defined on the multidimensional space;
  - (b) generate a centroid point c of set S, wherein centroid point c is a member of set S, and wherein to generate the centroid point c of set S, the instructions are further executable by the one or more processors to:
    - generate a projection of each point in set S onto each of a plurality of vectors v within a set V; and
    - select as centroid point c the point in S that minimizes a total difference, across all of the vectors v in V, between the projection of c onto each given vector v and the median of the projection of S onto the same given vector v;
  - (c) determine whether a distance between the centroid point c and the point p satisfies a threshold value;
  - (d) in response to determining that the distance between the centroid point c and the point p does satisfy the threshold value, return centroid point c as a mode m of set P and terminate, or in response to determining that the distance between the centroid point c and the point p does not satisfy a threshold value, assign centroid point c to point p and repeat (a) through (d).

13. The computer-readable storage medium as recited in claim 12, wherein to identify the set S of points within P that neighbor the selected point p, the instructions are further executable by the one or more processors to identify as members of set S one or more points within set P that, when the points in set P are hashed according to a set of hash functions, occupy one or more hash buckets in common with hashed point p.

14. The computer-readable storage medium as recited in claim 13, wherein to identify points in set P that occupy one or more hash buckets in common with hashed point p, the instructions are further executable by the one or more processors to query a hash data structure, wherein said hash data structure comprises records indicative of results of hashing each of the points in set P according to the set of hash functions.

15. The computer-readable storage medium as recited in claim 13, wherein the set of hash functions comprises the set V, wherein each of the vectors v is a 1-dimensional vector, and wherein the members of set V are randomly selected from the multidimensional space.

16. The computer-readable storage medium as recited in claim 15, wherein to hash a given point q within set P according to the set of hash functions, the instructions are further executable by the one or more processors to generate a projection of point q onto each of the vectors v within set V.

17. The computer-readable storage medium as recited in claim 16, wherein to generate a projection of point q onto a given one of vectors v within set V, the instructions are further executable by the one or more processors to determine a dot product between point q and given vector v.

18. The computer-readable storage medium as recited in claim 16, wherein to generate a projection of point q onto a given one of vectors v, the instructions are further executable by the one or more processors to retrieve a previously-determined value from said hash data structure, wherein the previously-determined value is indicative of a projection of point q onto the given vector v.

19. The computer-readable storage medium as recited in claim 12, wherein the members of set P correspond to image data that is representative of an image, wherein the image is capable of being displayed to a user.

20. The computer-readable storage medium as recited in claim 12, wherein the instructions are further executable by the one or more processors to:
- generate a plurality of modes of set P, wherein to generate each given one of said plurality of modes, the instructions are computer-executable to initialize a selected point q to a respective member of a set of points Q, wherein the modes correspond respectively to the members of set Q, wherein set Q is a subset of set P, and wherein to generate each given mode, the instructions are computer-executable to:
  - (e) for point q within Q, identify a set T including a plurality of points within Q that neighbor point q according to the distance metric defined on the multidimensional space;
  - (f) generate a centroid point d of set T, wherein centroid point d is a member of set T;
  - (g) determine whether a distance between the centroid point d and the point q satisfies a threshold value; and (h) in response to determining that the distance between the centroid point d and the point q does satisfy the threshold value, return centroid point d as the given mode of Q and terminate as to the given mode, or in response to determining that the distance between the centroid point d and the point q does not satisfy a threshold value, assign centroid point d to point q and repeat (e) through (h).

21. The computer-readable storage medium as recited in claim 20, wherein the instructions are further executable by the one or more processors to:
   (i) determine whether two or more members of set P have a common mode; and
   (j) in response to determining that said two or more members of set P have a common mode, assign said two or more members of set P to a same cluster of points.

22. The computer-readable storage medium as recited in claim 21, wherein to determine whether said two or more members of set P have a common mode, the instructions are further executable by the one or more processors to determine whether respective modes of said two or more members of set P differ by less than a threshold value.

23. A system, comprising:
   at least one processor; and
   a memory coupled to the at least one processor, wherein the memory stores instructions, wherein the instructions are executable by the at least one processor to:
      generate a mode m of a set P including a plurality of data points defined within a multidimensional space, wherein to generate said mode, the instructions are further executable by the at least one processor to:
         (a) for a point p selected from within set P, identify a set S including a plurality of points within set P that neighbor point p according to a distance metric defined on the multidimensional space;
         (b) generate a centroid point c of set S, wherein centroid point c is a member of set S, and wherein to generate the centroid point c of set S, the instructions are further executable by the at least one processor to:
            generate a projection of each point in set S onto each of a plurality of vectors v within a set V; and
            select as centroid point c the point in S that minimizes a total difference, across all of the vectors v in V, between the projection of c onto each given vector v and the median of the projection of S onto the same given vector v;
         (c) determine whether a distance between the centroid point c and the point p satisfies a threshold value;
         (d) in response to determining that the distance between the centroid point c and the point p does satisfy the threshold value, return centroid point c as a mode m of set P and terminate, or in response to determining that the distance between the centroid point c and the point p does not satisfy a threshold value, assign centroid point c to point p and repeat (a) through (d).

24. The system as recited in claim 23, wherein to identify the set S of points within P that neighbor the selected point p, the instructions are further executable by the at least one processor to identify as members of set S one or more points within set P that, when the points in set P are hashed according to a set of hash functions, occupy one or more hash buckets in common with hashed point p.

25. The system as recited in claim 24, wherein to identify points in set P that occupy one or more hash buckets in common with hashed point p, the instructions are further executable by the at least one processor to query a hash data structure, wherein said hash data structure comprises records indicative of results of hashing each of the points in set P according to the set of hash functions.

26. The system as recited in claim 24, wherein the set of hash functions comprises the set V, wherein each of the vectors v is a 1-dimensional vector, and wherein the members of set V are randomly selected from the multidimensional space.

27. The system as recited in claim 26, wherein to hash a given point q within set P according to the set of hash functions, the instructions are further executable by the at least one processor to generate a projection of point q onto each of the vectors v within set V.

28. The system as recited in claim 27, wherein to generate a projection of point q onto a given one of vectors v within set V, the instructions are further executable by the at least one processor to determine a dot product between point q and given vector v.

29. The system as recited in claim 27, wherein to generate a projection of point q onto a given one of vectors v, the instructions are further executable by the at least one processor to retrieve a previously-determined value from said hash data structure, wherein the previously-determined value is indicative of a projection of point q onto the given vector v.

30. The system as recited in claim 23, wherein the members of set P correspond to image data that is representative of an image, wherein the image is capable of being displayed to a user.

31. The system as recited in claim 23, wherein the instructions are further executable by the at least one processor to:
   generate a plurality of modes of set P, wherein to generate each given one of said plurality of modes, the instructions are executable by the at least one processor to initialize a selected point q to a respective member of a set of points Q, wherein the modes correspond respectively to the members of set Q, wherein set Q is a subset of set P, and wherein to generate each given mode, the instructions are executable by the at least one processor to:
      (e) for point q within Q, identify a set T including a plurality of points within Q that neighbor point q according to the distance metric defined on the multidimensional space;
      (f) generate a centroid point d of set T, wherein centroid point d is a member of set T;
      (g) determine whether a distance between the centroid point d and the point q satisfies a threshold value; and
      (h) in response to determining that the distance between the centroid point d and the point q does satisfy the threshold value, return centroid point d as the given mode of Q and terminate as to the given mode, or in response to determining that the distance between the centroid point d and the point q does not satisfy a threshold value, assign centroid point d to point q and repeat (e) through (h).

32. The system as recited in claim 31, wherein the instructions are further executable by the at least one processor to:
   (i) determine whether two or more members of set P have a common mode; and
   (j) in response to determining that said two or more members of set P have a common mode, assign said two or more members of set P to a same cluster of points.

33. The system as recited in claim 32, wherein to determine whether said two or more members of set P have a common mode, the instructions are further executable by the at least one processor to determine whether respective modes of said two or more members of set P differ by less than a threshold value.

34. A computer-implemented method, comprising:
(a) executing instructions on a specific apparatus comprising a processor so that binary digital electronic signals representing a set P including a plurality of data points defined within a multidimensional space are evaluated to identify, for a point p selected from within set P, a set S including a plurality of points within set P that neighbor point p according to a distance metric defined on the multidimensional space;
(b) executing instructions on said specific apparatus so that binary digital signals representing a centroid point c of set S are generated, wherein centroid point c is a member of set S, and wherein executing instructions on said specific apparatus so that binary digital signals representing the centroid point c of set S are generated comprises:
  executing instructions on said specific apparatus so that binary digital signals representing a projection of each point in set S onto each of a plurality of vectors v within a set V are generated; and
  executing instructions on said specific apparatus so that binary digital signals are generated that represent a selection as centroid point c the point in S that minimizes a total difference, across all of the vectors v in V, between the projection of c onto each given vector v and the median of the projection of S onto the same given vector v;
(c) executing instructions on said specific apparatus so that binary digital signals representing a distance between the centroid point c and the point p satisfies a threshold value are generated;
(d) executing instructions on said specific apparatus so that, if the distance between the centroid point c and the point p satisfies a threshold value, binary digital signals representing centroid point c are returned as a mode m of set P, or if the distance between the centroid point c and the point p does not satisfy the threshold value, binary digital signals representing centroid point c are assigned to represent point p and (a) through (d) are repeated; and
storing the mode m of set P in a memory location of said specific apparatus for later use.

\* \* \* \* \*